United States Patent
Willi et al.

(10) Patent No.: US 7,905,206 B2
(45) Date of Patent: Mar. 15, 2011

(54) ENGINE CONTROL SYSTEM HAVING FUEL-BASED ADJUSTMENT

(75) Inventors: Martin L. Willi, Dunlap, IL (US); Scott B. Fiveland, Metamora, IL (US); David T. Montgomery, Edelstein, IL (US); Weidong Gong, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 35 days.

(21) Appl. No.: 12/292,837

(22) Filed: Nov. 26, 2008

(65) Prior Publication Data

US 2010/0131173 A1    May 27, 2010

(51) Int. Cl.
F01L 1/34 (2006.01)
F02B 43/00 (2006.01)

(52) U.S. Cl. .................................... 123/90.15; 123/1 A
(58) Field of Classification Search .................. 123/1 A, 123/90.15–90.18
See application file for complete search history.

(56) References Cited

U.S. PATENT DOCUMENTS

| | | | |
|---|---|---|---|
| 5,027,769 A | 7/1991 | Yoshida et al. | |
| 5,168,954 A | 12/1992 | Nakaniwa et al. | |
| 5,325,829 A | 7/1994 | Iwasiuk | |
| 5,765,532 A | 6/1998 | Loye | |
| 5,806,490 A | 9/1998 | Nogi et al. | |
| 5,878,717 A | 3/1999 | Zur Loye | |
| 6,000,384 A | 12/1999 | Brown et al. | |
| 6,276,334 B1 | 8/2001 | Flynn et al. | |
| 6,286,482 B1 | 9/2001 | Flynn et al. | |
| 6,325,029 B1 * | 12/2001 | Takahashi | 123/90.15 |
| 6,354,268 B1 | 3/2002 | Beck et al. | |
| 6,371,092 B1 | 4/2002 | Guglielmo et al. | |
| 6,397,814 B1 | 6/2002 | Nagaishi et al. | |
| 6,651,618 B1 | 11/2003 | Coleman et al. | |
| 6,732,685 B2 | 5/2004 | Leman | |
| 6,799,552 B2 | 10/2004 | Crowell et al. | |
| 6,843,231 B1 | 1/2005 | Duffy et al. | |
| 6,882,929 B2 | 4/2005 | Liang et al. | |
| 6,935,287 B2 | 8/2005 | Shinogle | |
| 6,941,909 B2 | 9/2005 | Robel et al. | |
| 6,976,459 B2 | 12/2005 | Kagy et al. | |

(Continued)

FOREIGN PATENT DOCUMENTS

EP    0 945 606 A2    9/1999

(Continued)

OTHER PUBLICATIONS

"Throttleless engines—BMW Valvetronic" posted at http://www.autozine.org/technical_school/petrol2.htm (available Feb. 15, 2005).

(Continued)

*Primary Examiner* — Thomas N Moulis
(74) *Attorney, Agent, or Firm* — Finnegan, Henderson, Farabow, Garrett & Dunner LLC

(57) ABSTRACT

A control system for an engine having a cylinder is disclosed having an engine valve configured to affect a fluid flow of the cylinder, an actuator configured to move the engine valve, and an in-cylinder sensor configured to generate a signal indicative of a characteristic of fuel entering the cylinder. The control system also has a controller in communication with the actuator and the sensor. The controller is configured to determine the characteristic of the fuel based on the signal and selectively regulate the actuator to adjust a timing of the engine valve based on the characteristic of the fuel.

20 Claims, 3 Drawing Sheets

U.S. PATENT DOCUMENTS

| | | | |
|---|---|---|---|
| 6,986,330 B2 | 1/2006 | Fuwa et al. | |
| 7,000,596 B2 | 2/2006 | Zurloye et al. | |
| 7,055,492 B2 | 6/2006 | Yamaoka et al. | |
| 7,066,142 B2 | 6/2006 | Hanasato | |
| 7,073,485 B2 | 7/2006 | Truscott et al. | |
| 7,080,615 B2 | 7/2006 | Shinogle | |
| 7,131,416 B2 | 11/2006 | Sasaki et al. | |
| 7,152,559 B2 | 12/2006 | Kuo et al. | |
| 7,156,070 B2 | 1/2007 | Strom et al. | |
| 7,178,491 B2 | 2/2007 | Chang | |
| 7,201,121 B2 | 4/2007 | Weber et al. | |
| 7,210,457 B2 | 5/2007 | Kuzuyama | |
| 7,213,553 B2 | 5/2007 | Kalish et al. | |
| 7,228,828 B2 | 6/2007 | Kagy et al. | |
| 7,295,912 B2 | 11/2007 | Yasui et al. | |
| 7,325,529 B2 | 2/2008 | Ancimer et al. | |
| 7,331,317 B2 | 2/2008 | Yasui et al. | |
| 7,347,171 B2 | 3/2008 | Leman et al. | |
| 7,367,318 B2 | 5/2008 | Moriya et al. | |
| 7,400,966 B2 | 7/2008 | Strom et al. | |
| 7,454,285 B2 * | 11/2008 | Christie et al. | 701/105 |
| 7,597,072 B2 * | 10/2009 | Stein et al. | 123/90.15 |
| 7,621,257 B1 * | 11/2009 | Leone et al. | 123/431 |
| 7,658,171 B1 * | 2/2010 | Odell | 123/90.11 |
| 2002/0195086 A1 | 12/2002 | Beck et al. | |
| 2005/0039723 A1 | 2/2005 | Miura | |
| 2005/0061295 A1 * | 3/2005 | Minato | 123/406.45 |
| 2005/0241597 A1 | 11/2005 | Weber et al. | |
| 2005/0241613 A1 | 11/2005 | Weber et al. | |
| 2005/0247286 A1 | 11/2005 | Weber et al. | |
| 2007/0062193 A1 | 3/2007 | Weber et al. | |
| 2007/0089697 A1 | 4/2007 | Hara et al. | |
| 2008/0035111 A1 | 2/2008 | Schmid et al. | |
| 2009/0125209 A1 * | 5/2009 | Roberts, Jr. | 701/103 |
| 2009/0222194 A1 * | 9/2009 | Bowman et al. | 701/103 |

FOREIGN PATENT DOCUMENTS

| | | |
|---|---|---|
| EP | 1 772 608 A1 | 4/2007 |
| JP | 03011126 A | 1/1991 |
| JP | 03151518 A | 6/1991 |
| JP | 06108884 A | 4/1994 |
| JP | 07229409 | 8/1995 |
| JP | 09250379 A | 9/1997 |
| JP | 2001012266 | 1/2001 |
| JP | 2002285913 A | 10/2002 |
| JP | 2006152943 | 6/2006 |
| JP | 2006188952 A | 7/2006 |
| KR | 100812888 | 3/2008 |

OTHER PUBLICATIONS

"2008 Volkswagen Touareg BlueTDI" posted at http://www.supercarnews.net/2008-volkswagen-tuareg-blue-tdi (available Jul. 4, 2007).

* cited by examiner

US 7,905,206 B2

ENGINE CONTROL SYSTEM HAVING FUEL-BASED ADJUSTMENT

STATEMENT OF GOVERNMENT INTEREST

This invention was made with Government support under Contract No. DE-FC02-01CH11079, awarded by the Department of Energy. The Government may have certain rights in this invention.

TECHNICAL FIELD

The present disclosure is directed to an engine control system and, more particularly, to an engine control system having fuel-based adjustment.

BACKGROUND

Combustion engines are often used for power generation applications. These engines can be gaseous-fuel driven and implement lean burn, during which air/fuel ratios are higher than in conventional engines. For example, these gas engines can admit about 75% more air than is theoretically needed for stoichiometric combustion. Lean-burn engines increase fuel efficiency because they utilize homogeneous mixing to burn less fuel than a conventional engine and produce the same power output.

One shortcoming of heavy duty natural gas engines is that they may not be able to operate using a wide range of fuel variants such as, for example, fuels having a wide range of varying methane numbers. Engine parameters such as, for example, compression ratio may limit the range of fuel that heavy duty natural gas engines may use, thereby limiting the applications for which a given engine may be used.

A natural gas engine system is described in European patent application publication EP 0 945 606 A2 (the '606 publication), by Kawamura. The '606 publication discloses an engine system having a turbocharger, and valve controllers for varying a timing of intake valves of an engine cylinder, to vary an effective compression ratio. The '606 publication also discloses temperature sensors for sensing a temperature of the intake air and combustion chamber walls. A controller unit controls the valve controllers based on input from the temperature sensors.

Although the engine system of the '606 publication may vary intake valve timing based on a sensed temperature, it fails to adjust engine operation based on fuel composition. Therefore, the engine system of the '606 publication may fail to increase the range of fuel variants that can be used in the engine.

The present disclosure is directed to overcoming one or more of the shortcomings set forth above and/or other deficiencies in existing technology.

SUMMARY OF THE DISCLOSURE

In accordance with one aspect, the present disclosure is directed toward a control system for an engine having a cylinder. The control system includes an engine valve configured to affect a fluid flow of the cylinder, an actuator configured to move the engine valve, and an in-cylinder sensor configured to generate a signal indicative of a characteristic of fuel entering the cylinder. The control system also includes a controller in communication with the actuator and the sensor. The controller is configured to determine the characteristic of the fuel based on the signal and selectively regulate the actuator to adjust a timing of the engine valve based on the characteristic of the fuel.

According to another aspect, the present disclosure is directed toward a method of operating an engine. The method includes directing a premixed air/fuel mixture into a cylinder of the engine and sensing a parameter indicative of a characteristic of a fuel within the premixed air/fuel mixture as the premixed air/fuel mixture enters the cylinder. The method also includes selectively adjusting engine valve timing of the engine based on the characteristic.

DETAILED DESCRIPTION

Figure 1:
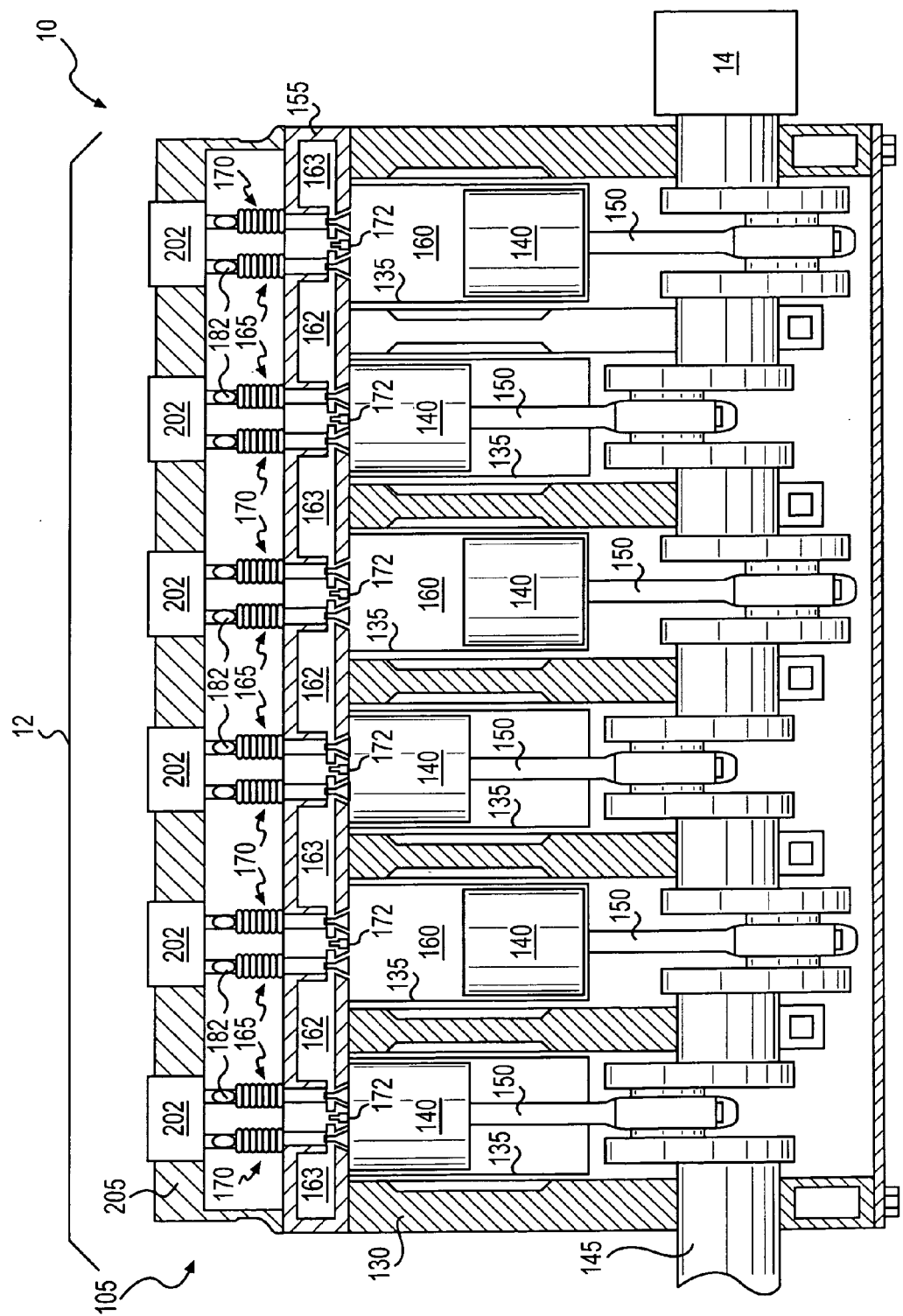
FIG. 1 is a pictorial illustration of an exemplary disclosed generator set.

FIG. 1 illustrates a generator set (genset) 10 having a prime mover 12 coupled to mechanically rotate a generator 14 that provides electrical power to an external load (not shown). Generator 14 may be, for example, an AC induction generator, a permanent-magnet generator, an AC synchronous generator, or a switched-reluctance generator. In one embodiment, generator 14 may include multiple pairings of poles (not shown), each pairing having three phases arranged on a circumference of a stator (not shown) to produce an alternating current with a frequency of about 50 and/or 60 Hz. Electrical power produced by generator 14 may be directed for offboard purposes to the external load.

Figure 2:
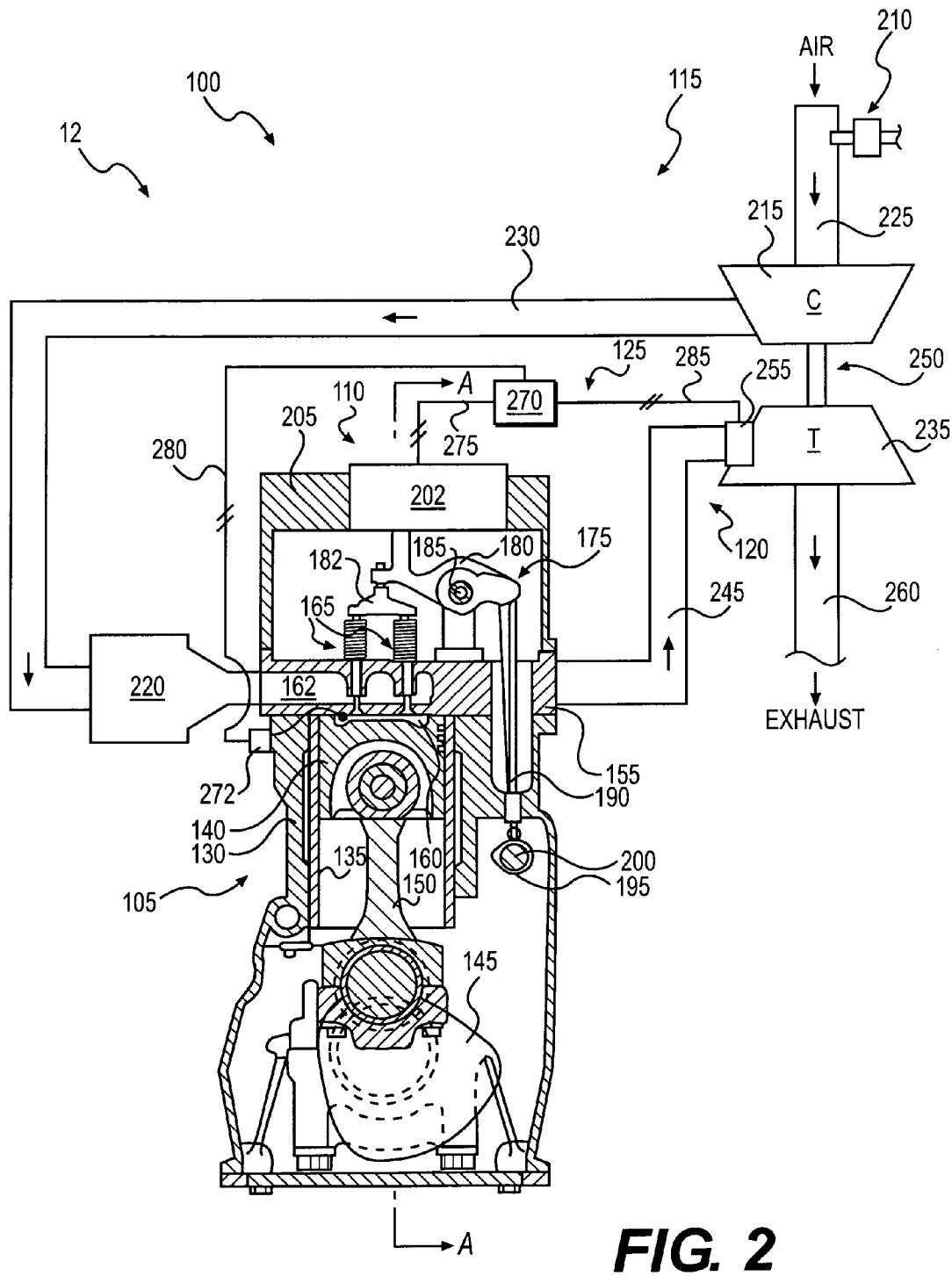
FIG. 2 is a schematic illustration of an exemplary disclosed engine system associated with the generator set of FIG. 1.

Prime mover 12 may include an engine system 100, as illustrated in FIG. 2. Engine system 100 may include an engine 105, a variable valve actuation system 110, an intake system 115, an exhaust system 120, and a control system 125. Intake system 115 may deliver air and/or fuel to engine 105, while exhaust system 120 may direct combustion gases from engine 105 to the atmosphere. Variable valve actuation system 110 may vary a valve timing of engine 105 to affect fluid flow of engine 105. Control system 125 may control an operation of variable valve actuation system 110, intake system 115, and/or exhaust system 120.

Engine 105 may be a four-stroke diesel, gasoline, or gaseous fuel-powered engine. As such, engine 105 may include an engine block 130 at least partially defining a plurality of cylinders 135 (only one shown in FIG. 2). In the illustrated embodiment of FIG. 1, engine 105 is shown to include six cylinders 135. However, it is contemplated that engine 105 may include a greater or lesser number of cylinders 135 and that cylinders 135 may be disposed in an "in-line" configuration, a "V" configuration, or in any other suitable configuration.

A piston 140 may be slidably disposed within each cylinder 135, so as to reciprocate between a top-dead-center (TDC) position and a bottom-dead-center (BDC) position during an intake stroke, a compression stroke, a combustion or power stroke, and an exhaust stroke. Returning to FIG. 2, pistons 140 may be operatively connected to a crankshaft 145 via a plurality of connecting rods 150. Crankshaft 145 may be rotatably disposed within engine block 130, and connecting rods 150 may connect each piston 140 to crankshaft 145 so that a reciprocating motion of each piston 140 results in a rotation of crankshaft 145. Similarly, a rotation of crankshaft 145 may result in a sliding motion of each piston 140 between the TDC and BDC positions. As shown in the lower portion of the graph of FIG. 3, piston 140 may move through the intake stroke from the TDC position (crank angle of about 0 degrees) to the BDC position (crank angle of about 180 degrees) to draw air and/or fuel into the respective cylinder 135. Piston 140 may then return to the TDC position (crank angle of about 360 degrees), thereby compressing the air/fuel mixture during the compression stroke. The compressed air/fuel mixture may ignite, causing piston 140 to move back to the BDC position (crank angle of about 540 degrees) during the power stroke. Piston 140 may then return to the TDC position (crank angle of about 720 degrees) to push exhaust gas from cylinder 135 during the exhaust stroke.

One or more cylinder heads 155 may be connected to engine block 130 to form a plurality of combustion chambers 160. As shown in FIG. 1, cylinder head 155 may include a plurality of intake passages 162 and exhaust passages 163 integrally formed therein. One or more intake valves 165 may be associated with each cylinder 135 and movable to selectively inhibit flow between intake passages 162 and combustion chambers 160. One or more exhaust valves 170 may also be associated with each cylinder 135 and movable to selectively inhibit flow between combustion chambers 160 and exhaust passages 163. Additional engine components may be disposed in cylinder head 155 such as, for example, a plurality of sparkplugs 172 that ignite an air/fuel mixture in combustion chambers 160.

Combustion pressures may vary between different cylinders 135 and between different combustion cycles of a single cylinder 135 during engine operation. Combustion pressures may vary between cylinders 135, for example, because of an uneven distribution of the air/fuel mixture delivered to the plurality of cylinders 135 via intake valve 165. Combustion pressures may vary between combustion cycles of the same cylinder 135, for example, because varying amounts of the delivered air/fuel mixture may be combusted in a given combustion cycle, thereby leaving some of the air/fuel mixture behind within cylinder 135. This residual air/fuel mixture may affect the combustion pressure of a subsequent combustion cycle. For example, variation between combustion cycles may occur because of strong or weak combustion events.

A strong combustion event may occur within a given cylinder 135 when substantially all of the air/fuel mixture trapped within cylinder 135 is fully combusted, resulting in a combustion pressure that may be higher than an average peak cylinder pressure. But, because substantially all of the air/fuel mixture within that cylinder 135 may be combusted during the strong combustion event, the combustion cycle immediately following the strong combustion event may be relatively weak within the same cylinder 135. That is, because there may be less residual air/fuel mixture than in a typical combustion cycle, the cylinder pressure within that cylinder 135 during the subsequent combustion cycle may have a pressure lower than the average peak cylinder pressure, varying significantly from the high combustion pressure of the previous cycle.

A weak combustion event may have an opposite effect, but also cause a significant pressure variation between combustion cycles. Specifically, during a weak combustion event, there may be significant pockets of the air/fuel mixture within cylinder 135 that do not combust, resulting in a combustion pressure that may be lower than an average peak cylinder pressure. Because there may be a significant amount of residual air/fuel mixture within cylinder 135 from the previous cycle, when additional air/fuel mixture is normally admitted for the subsequent cycle, there may be much more of the air/fuel mixture trapped within cylinder 135 than desired. As a result, the combustion pressure during the subsequent combustion cycle may be higher than the average peak cylinder pressure, resulting in a significant pressure variation between combustion cycles.

Detonation (i.e., knock) is an abnormal form of combustion that may be caused by cycle-to-cycle pressure variations. Detonation may cause components of engine 105 to fail such as, for example, a head gasket. Detonation may occur when excessive pressure within cylinder 135 (e.g., during a combustion cycle following a weak combustion event) causes the air/fuel mixture to autoignite. Autoignition may result in multiple pockets of simultaneous combustion within combustion chamber 160 instead of singular combustion. The multiple pockets of combustion can collide with each other with significant force, causing a rapid rise in cylinder pressure and a metallic pinging (i.e., knocking). The detonation forces may subject engine components to overloading, and continued detonation may reduce a service life of engine 105.

Engine 105 may include a plurality of valve actuation assemblies 175 that affect movement of intake valves 165 and/or exhaust valves 170 to help minimize engine knock. Each cylinder 135 may have an associated valve actuation assembly 175. Referring back to FIG. 2, each valve actuation assembly 175 may include a rocker arm 180 connected to move a pair of intake and/or exhaust valves 165, 170 via a bridge 182. Rocker arm 180 may be mounted to cylinder head 155 at a pivot point 185, and connected to a rotating camshaft 200 by way of a push rod 190. Camshaft 200 may be operatively driven by crankshaft 145, and may include a plurality of cams 195 that engage and move push rods 190.

Figure 3:
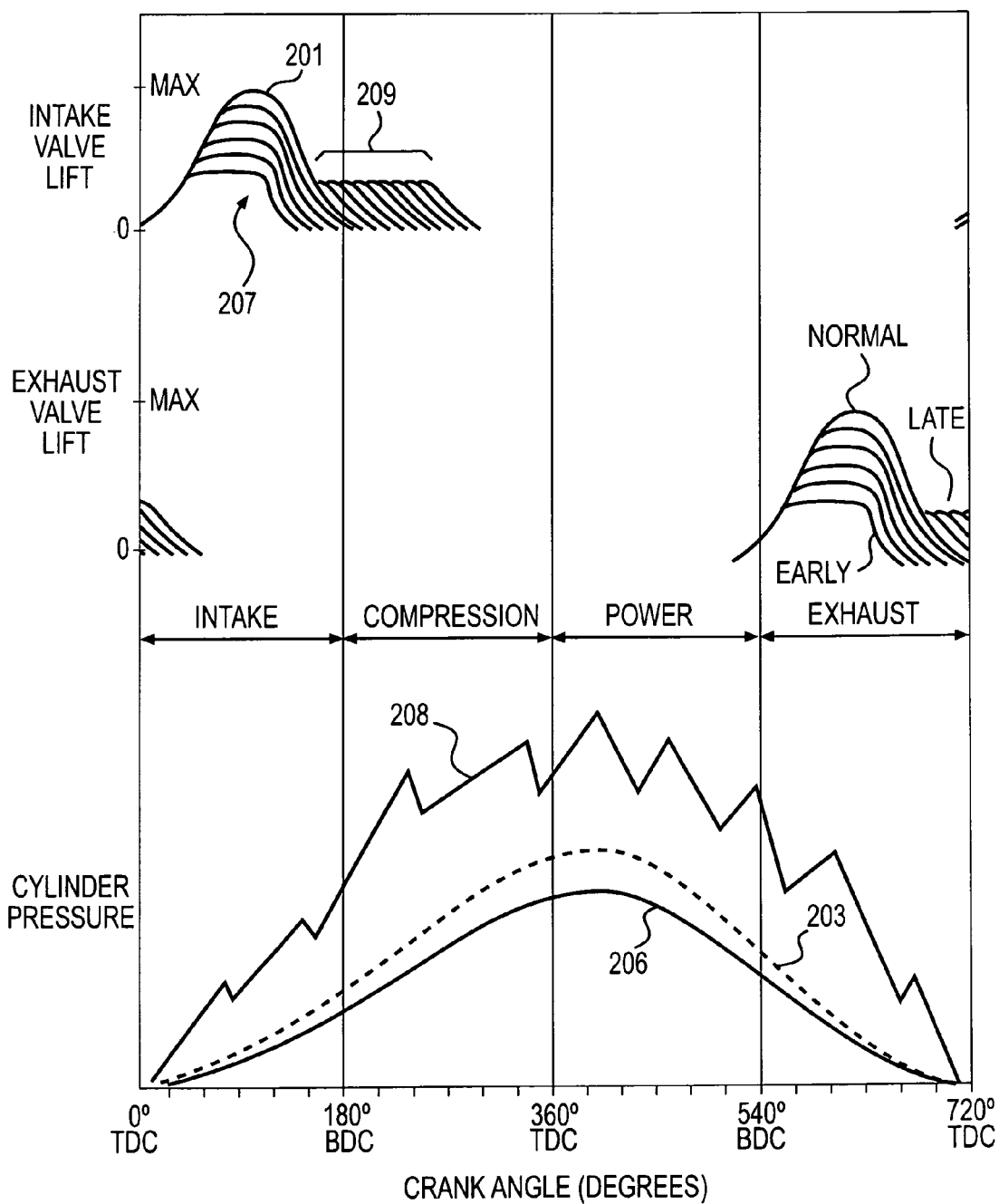
FIG. 3 is an exemplary disclosed graph associated with operation of the engine system of FIG. 2.

As pistons 140 move through the four stokes of the combustion cycle (i.e., intake, compression, power, and exhaust), crankshaft 145 may cyclically drive each valve actuation assembly 175 to move intake valves 165 and/or exhaust valves 170. As shown in FIG. 3, valve actuation assembly 175 may cause intake valves 165 to open during the intake stroke of piston 140. Actuation of intake valves 165 may generally follow profile 201 shown in the upper portion of the graph of FIG. 3. Intake valve 165 may open during the intake stroke, for example, at a crank angle of about 690° to about 0°, and may close at a crank angle of about 210°. Intake valves 165 may displace from a closed position to a maximum open position, during which the air/fuel mixture may be admitted into combustion chamber 160.

A pressure profile of cylinder 135 may substantially match a desired profile 203 during typical combustion events, as shown in the lower portion of the graph of FIG. 3. During a typical combustion event, a pressure within cylinder 135 may reach a peak at a crank angle of between about 360° to about 375° (i.e., at the end of the compression and beginning of the power strokes). Also, during the compression stroke of a typical combustion event, a rate of the pressure rise within cylinder 135 (i.e., a rise-rate of the pressure) may substantially match the slope of desired profile 203 (i.e., when a strong or weak combustion event does not occur). Desired profile 203 illustrates a desired combustion state free from significant detonation, where there is singular combustion of a desired magnitude.

An undesired profile 208, shown in FIG. 3, illustrates a combustion state in which multiple pockets of combustion occur and/or the pressure rise-rate is greater than desired and detonation is likely. The peak cylinder pressure during detonation may be reached earlier than TDC (i.e., during the compression stroke), which is undesirable for maximum efficiency, and have a peak higher than desired. Another undesired profile 206, shown in FIG. 3, illustrates a combustion state in which weak combustion occurs. Weak combustion may occur when a pressure rise-rate within cylinder 135 is less than a desired pressure-rise rate (i.e., less than that of profile 203) and/or a peak thereof is lower than desired. Profiles 203, 206, and 208 are illustrative only, and may vary based on engine operation such as, for example, based on valve timing.

Varying a closing of intake valve 165 may change the pressure profile within cylinder 135 (i.e., a rise-rate and/or a magnitude of the pressure). As shown by a family of curves 207 in FIG. 3, a closing of intake valve 165 may be selectively varied during the intake and/or the compression strokes by any appropriate amount. When intake valve 165 is closed within the family of curves 207, intake valve 165 may be selectively advanced and/or retarded. When intake valve 165 is advanced within the family of curves 207 (i.e., the closing is adjusted to be further away from profile 201), less air/fuel mixture may be trapped within cylinder 135, resulting in a decrease in pressure rise-rate and/or pressure magnitude within cylinder 135. When intake valve 165 is retarded within the family of curves 207 (i.e., the closing is adjusted toward profile 201), more air/fuel mixture may be trapped within cylinder 135, resulting in an increase in pressure rise-rate and/or pressure magnitude within cylinder 135. Intake valve 165 may also be selectively varied during the intake and/or the compression strokes by any appropriate amount within a family of curves 209, shown in FIG. 3. When intake valve 165 is closed within the family of curves 209, the closing may be selectively advanced and/or retarded. When intake valve 165 is retarded within the family of curves 209 (i.e., the closing moves further away from profile 201), less air/fuel mixture may be trapped within cylinder 135, resulting in a decrease in pressure rise-rate and/or pressure magnitude within cylinder 135. When intake valve 165 is advanced within the family of curves 209 (i.e., the closing moves toward profile 201), more air/fuel mixture may be trapped within cylinder 135, resulting in an increase in pressure rise-rate and/or pressure magnitude within cylinder 135. Intake valve 165 may be varied by an amount that substantially correlates to a comparison of an actual or anticipated pressure profile with the desired profile 203. Intake valve 165 may be varied by a greater or lesser amount, as required, to regulate the fluid flow to cylinder 135 and thereby bring the combustion profile within cylinder 135 toward the desired profile 203.

For example, when profile 208 is detected within cylinder 135, the closing of intake valve 165 may be advanced within the family of curves 207 or retarded within the family of curves 209 to decrease the magnitude and pressure rise-rate within cylinder 135 toward desired profile 203. The closing of intake valve 165 may thereby be adjusted away from a profile of intake valve 165 having a timing that has not been varied (i.e., away from unadjusted profile 201) when the pressure within cylinder 135 is higher than a desired pressure. In contrast, when profile 206 is detected within cylinder 135, the closing of intake valve 165 may be retarded within the family of curves 207 or advanced within the family of curves 209 to increase the magnitude and pressure rise-rate within cylinder 135 toward desired profile 203. The closing of intake valve 165 may thereby be adjusted toward a profile of intake valve 165 having a timing that has not been varied (i.e., toward unadjusted profile 201) when the pressure within cylinder 135 is lower than a desired pressure.

The timing of intake valve 165 may be adjusted based on detonation detection, a strong combustion detection, and/or a weak combustion detection (i.e., based on a measured rise-rate, a number of combustion pressure peaks, a magnitude of the peak, and/or an angular location of the peak). As shown in profile 208 of FIG. 3, detonation caused by autoignition may cause a slope of the pressure rise-rate in cylinder 135 to increase sharply, and the peak cylinder pressure may be reached before TDC of the compression stroke. Similarly, detonation caused by multiple combustion pockets may be observed as a plurality of sharp rises and/or drops in the pressure rise-rate. In profile 208, the pressure rise rate may sharply increase and/or decrease in an irregular pattern. The closing of intake valve 165 may be adjusted to reduce the likelihood and/or magnitude of detonation, and to create a balance between strong and weak combustion events. The timing of intake valve 165 may also be adjusted based on a detection of fuel quality. A low fuel quality (i.e., a fuel having a low methane number) may be more prone to detonation (i.e., profile 208), requiring valve timing to be adjusted. A high quality fuel such as, for example, a detonation-resistant pipeline gas may also require valve timing to be adjusted. It is also contemplated that the timing of intake valve 165 may be adjusted based on other parameters such as, for example, ambient air conditions including humidity and altitude.

It is contemplated that an opening of exhaust valve 170 may also or alternatively be advanced or retarded by variable valve actuation device 202. As illustrated in FIG. 3, an opening of exhaust valve 170 may be selectively advanced or additionally opened during portions of the compression and/or power strokes. Because more air/fuel mixture may escape from cylinder 135 during the compression and/or power strokes when the opening of exhaust valve 170 is advanced or during an additional opening, the amount of trapped mass within cylinder 135 may decrease, thereby decreasing a combustion pressure or a rise-rate, and/or the angular location of peaks within cylinder 135 may shift. The opening of exhaust valve 170 may also be selectively retarded during portions of the compression and/or power strokes. Because less air/fuel mixture may escape from cylinder 135 when the opening of exhaust valve 170 is retarded, the amount of trapped mass within cylinder 135 may increase, thereby increasing a combustion pressure, a rise-rate, and/or shifting the angular location of peaks within cylinder 135.

Variable valve actuation system 110 may include a plurality of variable valve actuation devices 202 configured to adjust timings of intake valves 165 and/or exhaust valves 170 to reduce effects of detonation, strong combustion events, and/or weak combustion events. As shown in FIGS. 1 and 2, variable valve actuation device 202 may be attached to and/or enclosed by a valve housing 205 of engine 105. Each cylinder 135 may have an associated variable valve actuation device 202. Variable valve actuation device 202 may selectively adjust an opening timing, closing timing, and/or lift magnitude of intake valves 165 and/or exhaust valves 170. Variable valve actuation device 202 may be any suitable device for varying a valve timing such as, for example, a hydraulic, pneumatic, or mechanical device.

In one example, variable valve actuation device 202 may be operatively connected to rocker arm 180, intake valve 165, and/or exhaust valve 170 to selectively disconnect a movement of intake and/or exhaust valves 165, 170 from a movement of rocker arm 180. For example, variable valve actuation device 202 may be selectively operated to supply hydraulic fluid, for example, at a low or a high pressure, in a manner to resist closing of intake and/or exhaust valves 165, 170. That is, after valve actuation assembly 175 is no longer holding intake valve 165 and/or exhaust valve 170 open, the hydraulic fluid in variable valve actuation device 202 may hold intake valve 165 and/or exhaust valve 170 open for a desired period. Similarly, the hydraulic fluid may be used to advance a closing of intake valve 165 and/or exhaust valve 170 so that intake valve 165 and/or exhaust valve 170 closes earlier than the timing affected by valve actuation assembly 175. Alternatively, intake and/or exhaust valves 165, 170 may be moved solely by variable valve actuation device 202 without the use of cams and/or rocker arms, if desired.

Variable valve actuation device 202 may selectively advance or retard a closing of intake and/or exhaust valves 165, 170 during the different strokes of engine 105. Intake valve 165 may be closed early, for example, at a crank angle of between about 180° and about 210°. Control system 125 may also control variable valve actuation device 202 to retard a closing of intake valve 165. Intake valve 165 may be closed, for example, at a crank angle of between about 210° and about 300°. Exhaust valve 170 may be varied to open at a crank angle of between about 510° and about 570° and may be varied to close at a crank angle of between about 700° and about 60°. Exhaust valve 170 may also be opened at a crank angle of about 330° and closed at a crank angle of about 390°. Control system 125 may control each variable valve actuation device 202 to vary the valve timing of each cylinder 135 independently of the valve timing of any other cylinder 135. Control system 125 may thereby independently control a throttling of each cylinder 135 solely by varying a timing of intake valves 165 and/or exhaust valves 170.

Referring back to FIG. 2, intake system 115 may direct air and/or fuel into combustion chambers 160, and may include a single fuel injector 210, a compressor 215, and an intake manifold 220. Compressor 215 may compress and deliver an air/fuel mixture from fuel injector 210 to intake manifold 220.

Compressor 215 may draw ambient air into intake system 115 via a conduit 225, compress the air, and deliver the compressed air to intake manifold 220 via a conduit 230. This delivery of compressed air may help to overcome a natural limitation of combustion engines by eliminating an area of low pressure within cylinders 135 created by a downward stroke of pistons 140. Therefore, compressor 215 may increase the volumetric efficiency within cylinders 135, allowing more air/fuel mixture to be burned, resulting in a larger power output from engine 105. It is contemplated that a cooler for further increasing the density of the air/fuel mixture may be associated with compressor 215, if desired.

Fuel injector 210 may inject fuel at a low pressure into conduit 225, upstream of compressor 215, to form an air/fuel mixture. Fuel injector 210 may be selectively controlled by control system 125 to inject an amount of fuel into intake system 115 to substantially achieve a desired air-to-fuel ratio of the air/fuel mixture. Variable valve actuation device 202 may vary a timing of intake valves 165 and/or exhaust valves 170 to control an amount of air/fuel mixture that is delivered to cylinders 135.

Exhaust system 120 may direct exhaust gases from engine 105 to the atmosphere. Exhaust system 120 may include a turbine 235 connected to exhaust passages 163 of cylinder head 155 via a conduit 245. Exhaust gas flowing through turbine 235 may cause turbine 235 to rotate. Turbine 235 may then transfer this mechanical energy to drive compressor 215, where compressor 215 and turbine 235 form a turbocharger 250. In one embodiment, turbine 235 may include a variable geometry arrangement 255 such as, for example, variable position vanes or a movable nozzle ring. Variable geometry arrangement 255 may be adjusted to affect the pressure of air/fuel mixture delivered by compressor 215 to intake manifold 220. Turbine 235 may be connected to an exhaust outlet via a conduit 260. It is also contemplated that turbocharger 250 may be replaced by any other suitable forced induction system known in the art such as, for example, a supercharger, if desired.

Control system 125 may include a controller 270 configured to control the function of the various components of engine system 100 in response to input from one or more sensors 272. Sensors 272 may be configured to monitor an engine parameter indicative of a pressure within cylinders 135 (i.e., robustness, pressure, and/or temperature of a combustion event). Each sensor 272 may be disposed within an associated cylinder 135 (i.e., in fluid contact with a respective one of combustion chambers 160), and may be electrically connected to controller 270. Sensor 272 may be any suitable sensing device for sensing an in-cylinder pressure such as, for example, a piezoelectric crystal sensor or a piezoresistive pressure sensor. Sensors 272 may measure a pressure within cylinders 135 during, for example, the compression stroke and/or the power stroke, and may generate a corresponding signal. Sensors 272 may transfer signals that are indicative of the pressures within cylinders 135 to controller 270.

Based on the signals, controller 270 may determine a combustion profile for each cylinder 135. The combustion profile may be a measurement of how the combustion pressure within cylinder 135 changes during a combustion cycle and from cycle to cycle. The combustion profile may be a continuous indication of combustion pressure within each cylinder 135 and may be used to predict, for example, whether strong, weak, or normal combustion will occur in a subsequent combustion event. Controller 270 may monitor the signals over time to determine a pressure rise-rate within cylinder 135, a number of pressure peaks during a single cycle, a magnitude of the peaks, and/or an angular location of the peaks. Controller 270 may then relate this information to the amount of the air/fuel mixture in cylinder 135 at any given time to thereby determine a combustion pressure profile of cylinder 135.

Controller 270 may then compare the pressure profiles of each cylinder 135 to a desired profile. In one example, the desired profile may be a profile that is predetermined such that balancing between cylinders 135 may be achieved. That is, the profile of one cylinder 135 may be compared with the profile of other cylinders 135 of engine 105. In another example, the desired profile may be a fixed base profile that may correspond to a given engine rating. In one embodiment, the desired profiles may be stored within a map of controller 270. Based on a comparison of the monitored profile with the desired profile, controller 270 may make adjustments to the timings of valves 165, 170.

For example, controller 270 may compare the pressure rise-rate of one cylinder 135 to profiles 203. If the monitored pressure rise-rate substantially matches that of profile 203, then controller 270 may determine that cylinder 135 has a desired combustion profile. If the pressure rise-rate substantially matches that of profile 208, then controller 270 may determine that cylinder 135 has a combustion profile with a rapid pressure rise-rate and/or multiple combustion pockets, indicating the possibility of detonation.

Controller 270 may also utilize the signal input from sensors 272 to determine an amount of air/fuel mixture remaining in cylinders 135. For example, controller 270 may determine, based on the monitored combustion profile, that a strong or weak combustion event has occurred in a given cylinder 135 during a given combustion cycle. A combustion profile indicating strong combustion may be a profile having a higher average pressure, peak pressure, or rise-rate than that of profile 203 (i.e., profile 208). A strong combustion cycle may indicate to controller 270 that there is less residual air/fuel mixture remaining in cylinder 135 than desired. A combustion profile indicating weak combustion (i.e., profile 206) may have an average pressure, peak pressure, or pressure rise-rate that is substantially lower than that of profile 203. A weak combustion cycle may indicate to controller 270 that there is more residual air/fuel mixture remaining in cylinder 135 than desired.

Controller 270 may also relate the signal from sensors 272 to a characteristic of a fuel such as fuel type and/or fuel quality. Controller 270 may input the signal from sensors 272 as data into an algorithm that determines fuel type and/or fuel quality as a function of cylinder pressure. Using the algorithm, controller 270 may determine fuel attributes such as methane number. Methane number is indicative of a detonation-resistance of a fuel, and is thereby indicative of fuel type and/or fuel quality. Engine 105 may be configured to operate using a desired fuel composition having a desired fuel type and/or quality and a corresponding desired methane number that results in desired combustion (i.e., profile 203). Controller 270 may relate the signal from sensors 272 to the desired cylinder pressure (i.e., profile 203) associated with the desired fuel type and/or fuel quality. It is also contemplated, as an alternative to the pressure measurement of step 300, that the fuel type and/or quality may be provided to controller 270 as a preprogrammed value or as an input provided by an operator.

Based on the determined fuel type and/or quality, controller 270 may make an appropriate adjustment to engine 105. Specifically, controller 270 may control variable valve actuation device 202 to selectively advance and/or retard intake and/or exhaust valves 165, 170 of cylinders 135. For example, controller 270 may advance a closing of intake valves 165 and/or retard an opening of exhaust valves 170 when the fuel quality is higher than the desired fuel quality. Controller 270 may retard a closing of intake valves 165 and/or advance an opening of exhaust valves 170 when the fuel quality is lower than the desired fuel quality. Controller 270 may selectively advance and/or retard intake valves 165 during, for example, an intake stroke, and/or selectively advance or retard exhaust valve 170 during the compression and/or power strokes. Controller 270 may selectively advance and/or retard intake and/ or exhaust valves 165, 170 based on, for example, sensor input measured during a stroke of a subsequent engine cycle or sensor input measured during the same stroke as the advancing and/or retarding.

Controller 270 may be any type of programmable logic controller known in the art for automating machine processes, such as a switch, a process logic controller, or a digital circuit. Controller 270 may serve to control the various components of engine system 100. Controller 270 may be electrically connected to the plurality of variable valve actuation devices 202 via a plurality of electrical lines 275. Controller 270 may also be electrically connected to the plurality of sensors 272 via a plurality of electrical lines 280. Controller 270 may be electrically connected to variable geometry arrangement 255 via an electrical line 285. It is also contemplated that controller 270 may be electrically connected to additional components and sensors of engine system 100 such as, for example, an actuator of fuel injector 210, if desired.

Controller 270 may include input arrangements that allow it to monitor signals from the various components of engine system 100 such as sensors 272. Controller 270 may rely upon digital or analog processing of input received from components of engine system 100 such as, for example, sensors 272 and an operator interface. Controller 270 may utilize the input to create output for controlling engine system 100. Controller 270 may include output arrangements that allow it to send output commands to the various components of engine system 100 such as variable valve actuation devices 202, variable geometry arrangement 255, fuel injector 210, and/or an operator interface.

Controller 270 may have stored in memory one or more engine maps and/or algorithms. Controller 270 may include one or more maps stored within an internal memory, and may reference these maps to determine a required change in engine operation, a modification of an engine parameter required to affect the required change in engine operation, and/or a capacity of engine 105 for the modification. Each of these maps may include a collection of data in the form of tables, graphs, and/or equations.

Controller 270 may have stored in memory algorithms associated with determining required changes in engine operation based on engine parameters such as, for example, combustion pressure. For example, controller 270 may include an algorithm that performs a statistical analysis of the combustion pressures within the plurality of cylinders 135 from combustion cycle to combustion cycle. Based on input received from sensors 272, the algorithm determines an average cylinder pressure per combustion cycle. The algorithm may then determine the statistical deviation of the combustion pressure of each cylinder 135 from the average combustion pressure. Using the statistical deviation, the algorithm may identify which cylinder pressures are required to be increased or decreased to reduce the variation in pressure. The algorithm may perform a similar statistical analysis of pressure variation between combustion cycles (i.e., as a function of time), to identify which cylinders 135 have combustion pressures that should be increased or decreased in subsequent combustion cycles.

INDUSTRIAL APPLICABILITY

The disclosed engine control system may be used in any machine having a combustion engine where consistent operation thereof is a requirement. For example, the engine control system may be particularly applicable to gaseous-fuel driven engines utilized in electrical power generation applications. Operation of genset 10 will now be described.

Engine 105 may combust fuel of a desired fuel quality having a desired methane number, which may result in normal combustion (i.e., profile 203 in the lower portion of FIG. 3). During normal combustion events, pistons 140 may move through the four strokes of the combustion cycle. The movement of pistons 140 drives the actuation of intake valves 165 and exhaust valves 170 via valve actuation assembly 175. Profile 203, shown in the lower portion of FIG. 3, may occur during normal combustion within cylinder 135.

Engine 105 may also combust fuel having a quality that is higher than the desired fuel quality (i.e., fuel having a methane number that is higher than the desired methane number). When the fuel quality is higher than the desired fuel quality, the closing of intake valve 165 may be retarded within the family of curves 207 or advanced within the family of curves 209 to increase an amount of trapped mass within cylinder 135 (i.e., adjusted toward unadjusted profile 201 of intake valve 165 having a timing that has not been varied). Controller 270 may simultaneously control variable geometry arrangement 255 to increase an orifice size of turbine 235. The increased orifice size reduces a speed of rotation of turbine 235, which decreases a pressure of the charge air (i.e., the amount of boost) provided by compressor 215 to intake manifold 220. Controller 270 may thereby control intake valve 165 and turbocharger 250 to substantially maintain an effective compression ratio of cylinder 135 when fuel quality is higher than the desired fuel quality.

Engine 105 may also combust fuel having a quality that is lower than the desired fuel quality (i.e., having a methane number that is lower than the desired methane number). When the fuel quality is lower than the desired fuel quality, the closing of intake valve 165 may be advanced within the family of curves 207 or retarded within the family of curves 209 to decrease an amount of trapped mass within cylinder 135 (i.e., adjusted away from unadjusted profile 201 of intake valve 165 having a timing that has not been varied). Controller 270 may simultaneously control variable geometry arrangement 255 to decrease an orifice size of turbine 235. The decreased orifice size increases a speed of rotation of turbine 235, which increases a pressure of the charge air (i.e., the amount of boost) provided by compressor 215 to intake manifold 220. Controller 270 may thereby control intake valve 165 and turbocharger 250 to lower an effective compression ratio of cylinder 135 when fuel quality is lower than the desired fuel quality.

Engine system 100 may adjust the operation of engine 105 based on fuel composition. Controller 270 may control a closing of intake valve 165 and an operation of turbocharger 250 to adjust the effective compression ratio of cylinders 135. Engine system 100 may thereby increase the range of varying compositions of fuel that can be used in engine 105, allowing engine 105 to be readily adaptable to various applications requiring fuel compositions of varying quality.

It will be apparent to those skilled in the art that various modifications and variations can be made to the disclosed method and apparatus. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A control system for an engine having a cylinder, the control system comprising:
    an engine valve configured to affect a fluid flow of the cylinder;
    an actuator configured to move the engine valve;
    a variable geometry turbocharger configured to modify a pressure of the fluid entering the cylinder;
    an in-cylinder sensor configured to generate a signal indicative of a characteristic of fuel entering the cylinder; and
    a controller in communication with the actuator, the variable geometry turbocharger, and the sensor, the controller being configured to:
        determine the characteristic of the fuel based on the signal;
        selectively regulate the actuator to adjust a timing of the engine valve based on the characteristic of the fuel; and
        modify a pressure of the mixture based on the characteristic using the variable geometry turbocharger.

2. The control system of claim 1, wherein the timing adjustment of the engine valve is associated with an adjustment of a pressure within the cylinder.

3. The control system of claim 1, wherein the engine valve is an intake valve.

4. The control system of claim 1, wherein the characteristic is a type of the fuel.

5. The control system of claim 1, wherein the characteristic is a quality of the fuel.

6. The control system of claim 5, wherein the in-cylinder sensor is a pressure sensor.

7. The control system of claim 6, wherein the controller is further configured to relate the signal from the pressure sensor to a desired cylinder pressure associated with a desired fuel quality, and to determine the quality of the fuel based on the comparison.

8. The control system of claim 5, wherein the controller is configured to regulate the actuator to adjust a valve closing toward an unadjusted profile when the quality of the fuel is higher than a desired fuel quality.

9. The control system of claim 8, wherein the variable geometry turbocharger is configured to direct charge air into the cylinder via the engine valve, wherein the controller is further configured to decrease a pressure of the charge air when the quality of the fuel is higher than the desired fuel quality.

10. The control system of claim 9, wherein the controller is further configured to regulate the actuator to adjust a valve closing away from an unadjusted profile and to increase a pressure of the charge air when the quality of the fuel is lower than the desired fuel quality.

11. The control system of claim 5, wherein the quality is associated with a methane number of the fuel.

12. A method of operating an engine, comprising:
    directing a premixed air/fuel mixture into a cylinder of the engine;
    sensing a parameter indicative of a characteristic of a fuel within the premixed air/fuel mixture as the premixed air/fuel mixture enters the cylinder;
    selectively adjusting engine valve timing of the engine based on the characteristic; and
    modifying a pressure of the mixture based on the characteristic using a variable geometry turbocharger.

13. The method of claim 12, wherein selectively adjusting engine valve timing includes selectively adjusting intake valve timing to change a pressure within the cylinder.

14. The method of claim 13, wherein the characteristic is one of a type of the fuel and a quality of the fuel.

15. The method of claim 14, wherein the parameter is a cylinder pressure.

16. The method of claim 15, further including comparing the cylinder pressure to a desired cylinder pressure associated with a desired fuel quality, and determining the quality of the fuel based on the comparison.

17. The method of claim 16, further including adjusting a valve closing toward an unadjusted profile when the quality of the fuel is higher than the desired fuel quality.

18. The method of claim 17, further including decreasing a pressure of charge air delivered to the cylinder using the variable geometry turbocharger when the quality of the fuel is higher than the desired fuel quality.

19. The method of claim 14, wherein the quality is associated with a methane number of the fuel.

20. A genset, comprising:
    a generator configured to generate an electrical output;
    an engine having:
        a cylinder;
        an engine valve configured to affect a fluid flow of the cylinder;
        an actuator configured to move the engine valve; and
        an in-cylinder sensor configured to generate a signal indicative of a quality of fuel entering the cylinder;
    a variable geometry turbocharger configured to modify a pressure of the fluid entering the cylinder;
    a controller in communication with the actuator, the variable geometry turbocharger, and the sensor, the controller being configured to:

determine the characteristic of the fuel based on the signal;

selectively regulate the actuator to adjust a timing of the engine valve based on the characteristic of the fuel; and decrease a pressure of the fluid using the variable geometry turbocharger when the quality of the fuel is higher than a threshold quality.

* * * * *